United States Patent
Shen

(10) Patent No.: US 7,052,633 B2
(45) Date of Patent: May 30, 2006

(54) METHOD FOR MANUFACTURING A TRANSPARENT ACRYLIC CONTAINER HAVING COLORED BUBBLES

(75) Inventor: Ying-Hui Shen, Tainan (TW)

(73) Assignee: Always Plastics COmpany, Tainan (TW)

(*) Notice: Subject to any disclaimer, the term of this patent is extended or adjusted under 35 U.S.C. 154(b) by 219 days.

(21) Appl. No.: 10/634,192

(22) Filed: Aug. 4, 2003

(65) Prior Publication Data
US 2005/0029694 A1 Feb. 10, 2005

(51) Int. Cl.
*B29D 31/00* (2006.01)
*B29C 65/00* (2006.01)

(52) U.S. Cl. ............ 264/54; 264/41; 264/45.1; 264/51

(58) Field of Classification Search ......... 264/41–55
See application file for complete search history.

(56) References Cited

U.S. PATENT DOCUMENTS
5,269,977 A * 12/1993 Nakahashi et al. .......... 264/1.9

* cited by examiner

Primary Examiner—Stephen J. Lechert, Jr.
(74) Attorney, Agent, or Firm—Alan D. Kamrath; Nikolai & Mersereau, P.A.

(57) ABSTRACT

A method for manufacturing a transparent acrylic container having colored bubbles includes the following steps: (A) preforming a plurality of colored beads, (B) forming a container made of transparent acrylic material, (C) adding a foam agent and the colored beads into the container such that the foam agent produces a plurality of transparent bubbles, and (D) curing the container to produce a container product containing a mixture containing the transparent bubbles and the colored beads, thereby producing a visible effect of colored bubbles. Thus, the transparent bubbles are mixed with the colored beads to produce a visible effect of colored bubbles, thereby enhancing the aesthetic quality of the container product.

6 Claims, 1 Drawing Sheet

METHOD FOR MANUFACTURING A TRANSPARENT ACRYLIC CONTAINER HAVING COLORED BUBBLES

BACKGROUND OF THE INVENTION

1. Field of the Invention

The present invention relates to a method for manufacturing a transparent acrylic container having colored bubbles, and more particularly to a method for manufacturing a transparent acrylic container, wherein the transparent bubbles are mixed with the colored beads so as to produce a visible effect of colored bubbles, thereby enhancing the aesthetic quality of the container product.

2. Description of the Related Art

A conventional transparent acrylic container is added with a foam agent during the forming process of the container, such that the container product contains multiple transparent bubbles therein. However, the multiple transparent bubbles contained in the container product lack variation of colors, thereby decreasing the aesthetic quality of the container product.

SUMMARY OF THE INVENTION

The primary objective of the present invention is to provide a method for manufacturing a transparent acrylic container having colored bubbles.

Another objective of the present invention is to provide a method for manufacturing a transparent acrylic container, wherein the transparent bubbles are mixed with the colored beads so as to produce a visible effect of colored bubbles, thereby enhancing the aesthetic quality of the container product.

A further objective of the present invention is to provide a method for manufacturing a transparent acrylic container, wherein the colored beads can tolerate a higher temperature (250° C.), such that the colored beads are not dissolved in the acrylic container (200° C.) and are mixed with the transparent bubbles so as to produce a visible effect of colored bubbles in the container product.

In accordance with the present invention, there is provided a method for manufacturing a transparent acrylic container having colored bubbles, comprising the steps of:

(A) preforming a plurality of colored beads;

(B) forming a container made of transparent acrylic material;

(C) adding a foam agent and the colored beads into the container during the forming process of the container, such that the foam agent produces a plurality of transparent bubbles in the container; and (D) curing the container to produce a container product containing a mixture of the transparent bubbles and the colored beads, thereby producing a visible effect of colored bubbles.

Further benefits and advantages of the present invention will become apparent after a careful reading of the detailed description with appropriate reference to the accompanying drawings.

DETAILED DESCRIPTION OF THE INVENTION

Figure 1:
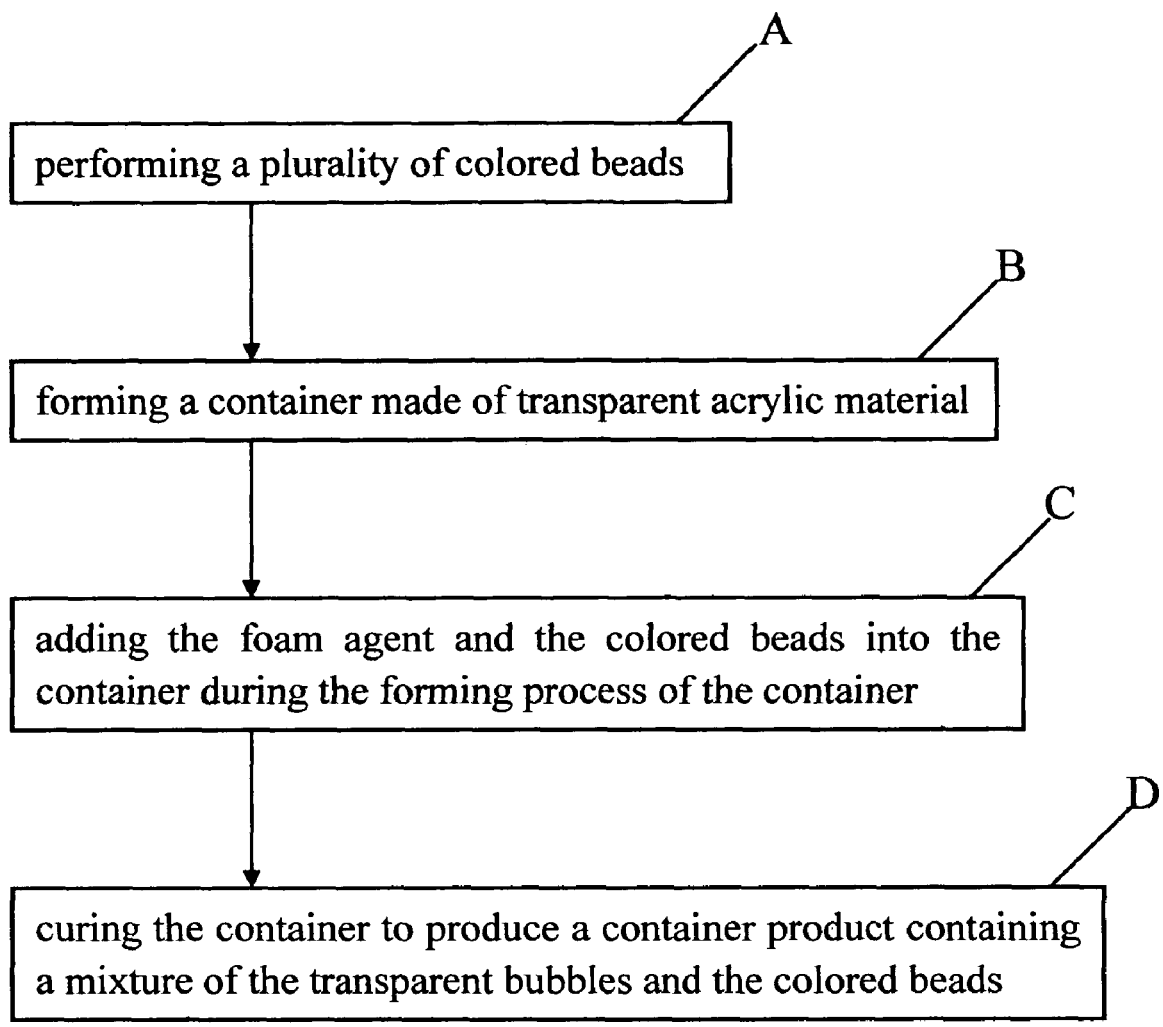
FIG. 1 is a flow chart of a method for manufacturing a transparent acrylic container having colored bubbles in accordance with the preferred embodiment of the present invention.

Referring to FIG. 1, a method for manufacturing a transparent acrylic container having colored bubbles in accordance with the preferred embodiment of the present invention comprises the steps of:

(A) preforming a plurality of colored beads;

(B) forming a container made of transparent acrylic material;

(C) adding a foam agent and the colored beads into the container during the forming process of the container, such that the foam agent produces a plurality of transparent bubbles in the container; and (D) curing the container to produce a container product containing a mixture of the transparent bubbles and the colored beads, thereby producing a visible effect of colored bubbles.

In the step (A), each of the colored beads is made of transparent material and can be heated under the temperature of 250° C.

In the step (B), the container can be heated under the temperature of 200° C. Thus, the container has a heat resistance smaller than that of each of the colored beads.

In the step (C), the transparent bubbles are mixed with the colored beads so as to produce a visible effect of colored bubbles, thereby enhancing the aesthetic quality of the container product.

In the step (D), the mixture contains two third (⅔) of the transparent bubbles and one third (⅓) of the colored beads.

Accordingly, the method for manufacturing a transparent acrylic container having colored bubbles in accordance with the present invention has the following advantages.

1. The transparent bubbles are mixed with the colored beads so as to produce a visible effect of colored bubbles, thereby enhancing the aesthetic quality of the container product.

2. The colored beads can tolerate a higher temperature (250° C.), so that the colored beads are not dissolved in the acrylic container (200° C.) and are mixed with the transparent bubbles so as to produce a visible effect of colored bubbles in the container product.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A method for manufacturing a transparent acrylic container having colored bubbles, comprising the steps of:

(A) preforming a plurality of colored beads;

(B) forming a transparent acrylic container made of transparent acrylic material;

(C) adding a foam agent and the colored beads into the transparent acrylic container during the forming process of the transparent acrylic container, such that the foam agent produces a plurality of transparent bubbles in the transparent acrylic container; and (D) curing the container to produce a transparent acrylic container product containing a mixture of the plurality of transparent bubbles and the plurality of colored beads, thereby producing a visible effect of colored bubbles so that the transparent acrylic container product presents a colored bubble visible effect by the mixture of the transparent bubbles and the colored beads contained in the transparent acrylic container product.

2. The method for manufacturing a transparent acrylic container having colored bubbles in accordance with claim 1, wherein in the step (A), each of the colored beads is made of transparent material.

3. The method for manufacturing a transparent acrylic container having colored bubbles in accordance with claim 1, wherein in the step (A), each of the colored beads can be heated under the temperature of 250° C.

4. The method for manufacturing a transparent acrylic container having colored bubbles in accordance with claim 1, wherein in the step (B), the container can be heated under the temperature of 200° C.

5. The method for manufacturing a transparent acrylic container having colored bubbles in accordance with claim 1, wherein in the step (D), the mixture contains two third (⅔) of the transparent bubbles and one third (⅓) of the colored beads.

6. The method for manufacturing a transparent acrylic container having colored bubbles in accordance with claim 1, wherein the container has a heat resistance smaller than that of each of the colored beads.

* * * * *